United States Patent Office 3,288,804
Patented Nov. 29, 1966

3,288,804
1,2,3-TRIAZOLE DERIVATIVES OF 3-PHENYL-COUMARIN COMPOUNDS
Fritz Fleck, Bottmingen, Hans Balzer, Munchenstein, and Horst Aebli, Basel, Switzerland, assignors to Sandoz Ltd. (also known as Sandoz A.G.), Basel, Switzerland
No Drawing. Filed Oct. 12, 1964, Ser. No. 403,368
Claims priority, application Switzerland, Oct. 15, 1963, 12,619/63
9 Claims. (Cl. 260—308)

The present invention relates to new 1,2,3-triazole derivatives; it also relates to their use in marking substrates, especially brightening plastics, and the resulting marked products.

The present invention provides 1,2,3-triazole derivatives of 3-phenyl-courmarin of the formula

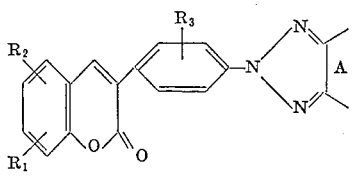

wherein A designates a substituent selected from dihydroaryl radicals linked on two vicinal carbon atoms to two of the nitrogen atoms of the triazole ring as shown in the said formula and such radicals substituted with a non-ionogenic substituent, and
each of $R_1$, $R_2$ and $R_3$ is selected from hydrogen atoms and non-ionogenic substituents.

The aforesaid triazoles are prepared by a process characterized in that a primary amine of the formula

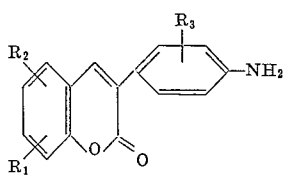

wherein $R_1$, $R_2$ and $R_3$ have the above significance, is diazotized, the resulting diazonium salt is united with a primary aromatic amine capable of coupling in vicinal relation to a primary amino group, and the resulting o-amino-azo dyestuff is converted by oxidation to the corresponding 1,2,3-triazole compound.

Examples of suitable values for $R_1$, $R_2$ and $R_3$ are hydrogen atoms, lower alkyl radicals (e.g., those with from 1 to 5 C atoms inclusive, for example methyl, ethyl and isopropyl radicals) and lower alkoxy radicals (e.g., those with from 1 to 5 C atoms inclusive, for example methoxy and ethoxy radicals).

Specific examples of primary amines for diazotizing are 3-(p-aminophenyl)-coumarin, 3-(p-aminophenyl)-6-methyl-coumarin, 3-(p-aminophenyl)-7-methyl-coumarin, 3-(p-aminophenyl)-6,7-dimethyl-coumarin and 3-(p-aminophenyl)-7-methoxy-coumarin.

Examples of specific primary amines for coupling with the diazonium salt are:

aminobenzenes, e.g.—
  1-amino-4-methyl-5-methoxybenzene,
  1-amino-4-chloro-5-methoxybenzene,
  1-amino-4,5-dimethoxybenzene and
  4,4'-diamino-2,2'-dimethoxydiphenyl;

diaminobenzenes, e.g.—
  m-phenylenediamine,
  m-toluylenediamine (2,4-diamino-1-methylbenzene),
  1,3-diamino-4-methoxybenzene and
  1,3-diamino-4-chlorobenzene;

aminonaphthalenes, e.g.—
  2-aminonaphthalene,
  2-amino-5-methoxynaphthalene,
  2-amino-6-methoxynaphthalene,
  2-amino-7-methoxynaphthalene,
  1-amino-4-methylnaphthalene,
  1-amino-4-methoxynaphthalene,
  1-amino-5,8-dichloronaphthalene,
  1-amino-5-methylsulphonylnaphthalene,
  1-amino-naphthalene-5-sulphonic acid N-dimethylamide, or derivatives thereof containing sulpho radicals, e.g.—
  2-aminonaphthalene-1-sulphonic acid,
  naphthyl-2-sulphamic acid and
  naphthyl-2-methylamino-ω-sulphonic acid.

The last mentioned compounds, in comparison with the corresponding compounds free of sulpho radicals, have the advantage of a lower physiological hazard. The sulpho or sulphomethyl radicals are eliminated on the formation of the dyestuff. Further coupling components which may be used are:

aminoacenaphthenes, e.g.—
  4- and 5-aminoacenaphthene,
  6-chloro-5-aminoacenaphthene and
  6-methoxy-5-aminoacenaphthene aminobenztriazoles, e.g.—
  2-phenyl-5-(6)-aminobenztriazole,
  2-naphthyl-5-(6)-aminobenztriazole,
  2-(p-chlorophenyl)-5-aminobenztriazole,
  2-(p-tolyl)-5-aminobenztriazole,
  2-(p-cyanophenyl)-5-aminobenztriazole,
  2-(p-methoxyphenyl)-5-aminobenztriazole,
  2-phenyl-6-halogeno-5-aminobenztriazole,
  2-phenyl-6-alkyl-5-aminobenztriazole and
  2-phenyl-6-alkoxy-5-aminobenztriazole;

aminoindazoles, e.g.—
  6-aminoindazole
  5-aminoindazole; etc.

When a polyamine is used as the coupling component, it is recommended to acylate the amino radicals remaining after triazolizing the resulting azo dyestuff or to diazotize and subsequently remove them or to replace the diazotized amino radicals by a non-ionogenic substituent, because the free amino radicals detract from the stability to light of the brightener.

Preferably, the primary aromatic amine, which is coupled with the diazonium salt, should contain a sulpho or sulphomethyl radical which is split off under the reaction conditions; such amines are known and examples are the above specified three aminonaphthalenes.

Since the o-amino dyestuffs are water insoluble, their oxidation is suitably effected in the presence of organic solvents stable to oxidation. For example, dimethylformamide, pyridine, halogenohydrocarbons, e.g., chlorobenzene, are suitable.

Examples of suitable oxidizing agents are: Alkali metal hypohalogenites, preferably sodium hypochlorite, cupric salt complexes of inorganic or organic cupric salts, e.g., copper sulphate, copper carbonate, copper acetate, copper naphthalene, etc., and nitrogenous bases, e.g., ammonia, amines, pyridine, etc.

The compounds of the invention are suitably purified by crystallizing from an organic solvent, if desired with addition of activated charcoal, or from mixtures of organic solvents with water, if desired with addition of a small quantity of alkali metal hydrosulphite.

Preferably the oxidation in the process of the present invention is effected in an organic solvent by means of a complex of a copper II salt of an organic carboxylic acid and a nitrogenous base.

Particularly suitable starting materials in the process of the invention are: 3-(p-aminophenyl)-7-methoxy-coumarin and the sodium or potassium salt of 2-naphthylamine-1-sulphonic acid; and 3-(p-aminophenyl)-coumarin and the sodium or potassium salt of 2-naphthylamine-1-sulphonic acid.

The compounds of the present invention are insoluble in water; they are usually colourless or almost so. In general, however, they are soluble giving a violet blue to greenish blue fluorescence in organic solvents, for example acetone, dioxane, ethyleneglycolmonomethyl ether, dioctylphthalate, dimethyl formamide, dimethyl sulphoxide, pyridine, toluene, xylene, chlorobenzene, o-dichlorobenzene, trichloroethylene, tetrachloroethylene and others.

The compounds of the present invention are especially suitable as brightening or marking agents for slightly coloured plastics or other organic materials, which may be in the form of films, pressed articles, castings or fibres of polymeric, copolymeric or polycondensed plastics, for example polyesters, polyamides, polyurethanes, polyacrylonitrile, polyvinyl chloride, polyvinylidene chloride, polyolefines; other examples of such plastics are acetate silk and cellulose triacetate. They may likewise be used for brightening or marking fats, oils, waxes, paraffins, etc.

Of particular importance is the use of the compounds of the present invention for brightening polyester fibres of the polyglycolterephthalate group, for example Terylene, Dacron, etc. In general, on these fibres they produce a neutral blue to greenish blue fluorescence. The compounds of the present invention may be used on their own or in combination with known brighteners. The compounds of the present invention are not only brighteners, but they likewise give valuable assistance in correcting shades, for example in correcting undesirable red tinges.

One method of applying the compounds of the present invention is by dissolving them in the plastic material to be marked before shaping it, e.g., in the solution used for spinning or in the mass used for pressing, casting, extruding or otherwise shaping. Furthermore, the compounds of the present invention may be incorporated in softeners which are added to the spinning solution or mass for pressing, casting, extruding or otherwise shaping. Another method is to apply the compounds of the present invention to the material to be brightened from organic solvents, for example in dry cleaning, or with the aid of an emulsion of an organic solvent or carrier in which they are dissolved. A further method of applying the compounds of the present invention is from an aqueous dispersion, i.e., in the absence of a solvent, for example (i) by the so-called "Foulardtherm" process, in which the brightener, which has been evenly applied to the material to be brightened by cold dipping (padding) in an aqueous suspension, is fixed by a subsequent heat treatment, or (ii) by the process normally used for dyeing with dispersion dyestuffs.

Since, in general, the compounds of the present invention are stable to oxidation, they are especially suitable for use in chemical bleaching where they are added to the bleaching bath, for example a chlorite bath, in dispersed form, optionally together with a carrier.

When the compounds of the present invention are in solution and/or on a substrate, in general they show a particularly good fastness to light and produce whiteness effects of good stability to washing.

The following examples illustrate the invention. The term "parts," when used without qualification, indicates parts by weight; the relationship of parts by volume to parts by weight is that of litres to kilograms. The temperatures are stated in degrees centigrade.

*Example 1*

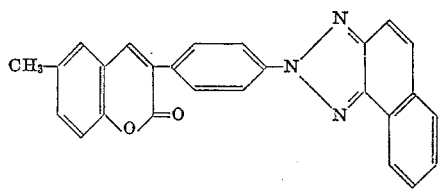

15.75 parts of the moist double tin salt of 3-(p-aminophenyl)-6-methyl-coumarin (amine content 31.9%) are dissolved in 120 parts of dimethyl formamide while stirring and warming. While the solution is still hot 4 parts of 36.5% of hydrochloric acid solution are added, dilution with 120 parts each of water and ice is effected and there is thus obtained a suspension to which there is added advantageously 1 part of a 1% aqueous solution of a non-ionogenic dispersing agent. The mixture is cooled to 0–5°, diazotized with 1.4 parts of sodium nitrite (in the form of a 30% aqueous solution) and stirred for 3–5 hours in order to complete the reaction. Coupling is then effected at 8–10° with a solution consisting of 4.46 parts of 2-naphthylamine-1-sulphonic acid, 0.8 part of sodium hydroxide and 30 parts of water, and heating is effected slowly to 40°. Simultaneously, 6–7 parts of crystalline sodium acetate dissolved in 12 parts of water are added dropwise. After the reaction is complete, the dyestuff is filtered off and washed with water until neutral. While still moist the dyestuff is dissolved in pyridine and, at 25–30°, there is added 34 parts of an aqueous, about 17% sodium hypochlorite solution during 30 minutes. By slowly heating the mixture to the boiling point the oxidation is completed. The pyridine is removed from the mixture by blowing through water vapour to which there had been previously added with advantage a reducing agent, for example 0.5–1 part of sodium hydrosulphite. The precipitated, water insoluble product is filtered off, washed with water and dried. By recrystallizing from chlorobenzene and treating with activated charcoal there is obtained an almost colourless crystalline powder. It consists of the compound of the above formula and melts at 252–254°.

The same compound is obtained when in this example the 2-aminonaphthalene-1-sulphonic acid is replaced with 4.46 parts of naphthyl-(2)-sulphaminic acid, or 4.74 parts of naphthyl-(2)-amino-methane-sulphonic acid.

Compounds of very similar properties are obtained by replacing in this example the 2-amino-naphthalene-1-sulphonic acid with 2.74 parts of 1-amino-4-methyl-5-methoxy-benzene, or 3.15 parts of 1-amino-4-chloro-5-methoxy-benzene, or 3.06 parts of 1-amino-4,5-dimethoxy-benzene.

*Example 2*

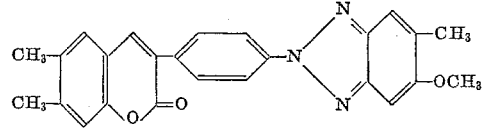

47.8 parts of the moist double tin salt of 3-(p-aminophenyl)-6,7-dimethyl-coumarin (amine content 11.1%) are dissolved in 100 parts of dimethyl formamide and diazotized as described in Example 1. To the resulting yellow diazo suspension there is added at 8° a solution of 2.74 parts of 1-amino-4-methyl-5-methoxy-benzene in 40 parts of water and 3 parts by volume of a 36.5% hydrochloric acid solution. A solution of 11–12 parts of crystalline sodium acetate in 22 parts of water are added dropwise while stirring to the resulting mixture and coupling is completed by heating to 40–50°. The resulting dyestuff is filtered, washed with water, stirred in 150 parts by volume of chlorobenzene at 70° and oxidized at the same temperature with a mixture of 25.4 parts of copper naphthenate (10% Cu), 12.6 parts of pyridine and 25 parts of chlorobenzene. After the addition of the oxidizing agent, stirring at 70-80° is effected until the dyestuff has disappeared. The temperature is raised to the boil, the water is distilled off, the residue is dissolved in the 10-20-fold amount of chlorobenzene and the hot solution is filtered after the addition of decolourizing charcoal. After cooling the filtrate, a fine precipitate is obtained which is purified by recrystallizing from chlorobenzene. It consists of a compound having the above formula and melts at 305-307°.

Products with very similar properties are obtained when in this example the 1-amino-4-methyl-5-methoxy-benzene is replaced with 3.15 parts of 1-amino-4 chloro-5-methoxy-benzene, or 3.06 parts of 1-amino-4,5-dimethyl-benzene, the procedure being otherwise the same.

When in this example there is used, instead of the 1-amino-4-methyl-5-methoxy-benzene, 4.46 parts of 2-naphthylamine-1-sulphonic acid, or 2.86 parts of 2-amino-naphthalene as coupling component and the procedure is otherwise the same as stated above, there results a compound in the form of pale orange crystals which has a melting point of 282-284°.

*Example 3*

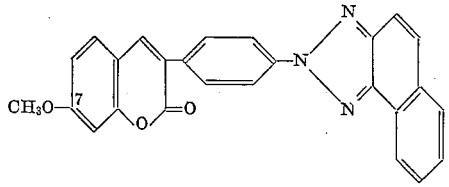

5.34 parts of 3-(p-aminophenyl)-7-methoxy-coumarin are dissolved in the hot in 160 parts of dimethyl formamide. Below 90,° while the solution is still hot, there are added at least 1.83 parts of hydrochloric acid gas and the resulting fine suspension of the amine hydrochloride is diluted with 150 parts each of water and ice. The mixture is cooled to 0-5° and diazotized with 1.4 parts of sodium nitrite (as a 30% aqueous solution). After the reaction is completed, a solution of 4.46 parts of 2-naphthylamine-1-sulphonic acid and 0.8 part of sodium hydroxide in 30 parts of water are added to the diazo suspension, there being formed a dyestuff on warming to 40° and the simultaneous dropwise addition of 6 parts of crystalline sodium acetate in 12 parts of water. This dyestuff is separated by filtering and washed with water until neutral.

While still moist the dyestuff is dissolved in pyridine and 10 parts of copper acetate are added at 70-80° during 30 minutes. After boiling at reflux for several hours the dyestuff has disappeared. The pyridine is removed from the mixture by blowing through water vapour and the insoluble material is separated by filtration. The dried material is extracted with chlorobenzene while warm. A solution of the crystallized new compound intensively fluoresces with a green blue shade. It has a constitution characterized by the above formula, and its melting point is about 248-249°.

Similar compounds are obtained when in this example the 2-naphthylamine-1-sulphonic acid is replaced with 2.74 parts of 1-amino-4-methyl-5-methoxy-benzene, or 3.15 parts of 1-amino-4-chloro-5-methoxy-benzene, or 3.06 parts of 1-amino-4,5-dimethoxy-benzene.

*Example 4*

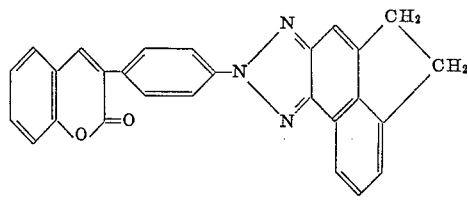

20.6 parts of the moist double tin salt of 3-(p-aminophenyl)-coumarin (amine content 23%) are dissolved at 95° in 130 parts by volume of a mixture of 65 parts of ethyleneglycolmonoethyl ether and 65 parts of water. One part of a 1% solution of a non-ionogenic dispersing agent, e.g., oleyleikosaglycol ether, 3 parts of volume of concentrated hydrochloric acid (36.5%) and 65 parts of ice are added and cooling to 0-5° is effected. Diazotization is effected by the addition of 1.4 parts of sodium nitrite in the form of a 30% aqueous solution and the reaction is completed by stirring for several hours at 5-8°. 3.4 parts of 5-amino-acenaphthene dissolved in pyridine are added to the diazo suspension in order to effect coupling and heating is effected to about 40° by simultaneously buffering the acid through dropwise addition of sodium acetate solution. The dyestuff produced in this way is filtered off, washed with water and dried. It is stirred with 100-150 parts of pyridine, 25.4 parts of copper naphthenate (10% Cu) are added at room temperature, heating to 75° is effected and stirred at this temperature until it disappears. Subsequently the resulting oxidation product is heated to the boil and the slightly turbid solution is filtered, after the addition of activated charcoal, at boiling heat. The filtrate is reduced in volume and cooled, fine crystals forming thereby, which crystals are capable of further purification by recrystallizing from chlorobenzene. They consist of a compound to which the above formula is assigned.

*Example 5*

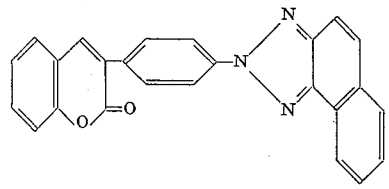

8.2 parts of a moist paste of 3-(p-amino-phenyl)-coumarin hydrochloride (amine content 57.8%) are stirred with 20 parts by volume of ethyleneglycolmonoethyl-ether at room temperature until homogeneous, 3 parts by volume of concentrated hydrochloric acid (36.5%) and 24 parts each of water and ice are added. At about 0° 1.4 parts of sodium nitrite (in the form of a 30% aqueous solution) are run underneath the surface of the mixture while stirring is continued for a further 3-5 hours at 5-8° in order to complete the reaction, a yellow suspension being formed thereby. By adding a solution consisting of 4.46 parts of 2-naphthylamine-1-sulphonic acid, 0.8 part of sodium hydroxide and 30 parts of water, heating to 45° and simultaneous dropwise addition of a 5% aqueous ammonia solution until the pH value of the mixture has risen to 4, the resulting dyestuff is obtained in practically quantitative yield. This dyestuff is separated as usual, purified, then dried, stirred with 130 parts of chlorobenzene and 25.4 parts of copper naphthenate (10% Cu) are added at room temperature. Thereupon ammonia gas is introduced, while stirring, into the mixture, heating to 50-60° is effected and stirring is continued until the dyestuff has disappeared. The resulting brown suspension is heated to the boil and filtered while hot. On cooling, the compound of above formula separates out from the filtrate in the form of fine crystals; after purification they have an almost colourless aspect and melt at 250-252°. In the usual solvents the product fluoresces violet blue and because of its weak own colouration it is admirably suitable for brightening or marking organic materials. Products with quite similar properties are obtained when the 2-naphthylamine-1-sulphonic acid in this example is replaced with 2.74 parts of 1-amino-4-methyl-5-methoxy-benzene, or 3.15 parts of 1-amino-4-chloro-5-methoxy-benzene, or 3.06 parts of 1-amino-4,5-dimeth-oxy-benzene.

Example 6

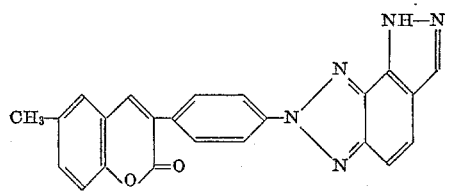

15.75 parts of the moist double tin salt of 3-(p-aminophenyl)-6-methyl-coumarin (amine content 31%) are diazotized as described in Example 1. 2.66 parts of 6-aminoindazole dissolved in pyridine are added to the resulting diazo suspension and coupling is effected by heating to 40° while simultaneously adding dropwise sodium acetate solution. The resulting dyestuff is filtered off, washed well with water and dried. After suspending this dyestuff in 100–150 parts of chlorobenzene, 25.4 parts of copper naphthenate (10% Cu) and 9.75 parts of monoethanolamine are added at 70° over a period of 30 minutes and stirring at this same temperature effected until the dyestuff has disappeared. The mixture is filtered at the boiling heat after the addition of decolourizing charcoal. On cooling a fine crystalline precipitate appears in the filtrate. The crude product is recrystallized from dimethyl formamide/water. The purified crystals have a strong blue fluorescence when dissolved in ethyleneglycolmonoethyl ether and may be used as brighteners for synthetic fibres of the kind already mentioned. They are also suitable for brightening the most varied organic materials. They consist of a compound of the above formula.

Example 7

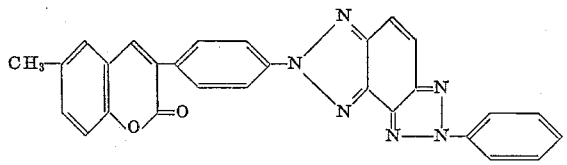

15.75 parts of the moist double tin salt of 3-(p-aminophenyl)-6-methyl-coumarin (amine content 31.9%) are dissolved at boiling heat in 120 parts of a mixture of Cellosolve and water (1:1). 3 parts of concentrated hydrochloric acid (36.5%) and 2 parts of a 1% aqueous solution of a non-ionogenic dispersing agent, for example oleyleikosaglycol ether, are added to the solution and cooling is quickly effected to 0–5° while stirring. By the addition of 1.4 parts of sodium nitrite (as a 30% aqueous solution) diazotization is effected and the resulting suspension is stirred at about 8° for several hours in order to complete the reaction. Thereafter a solution of 4.2 parts of 2-phenyl-5(6)-amino-benztriazole in pyridine is added and the coupling, which has commenced, is completed by warming to 40°.

The resulting moist dyestuff is stirred with 150 parts of pyridine at 60° and the resulting suspension is cooled to room temperature. At 20–25° 35–40 parts of an about 17% sodium hypochlorite solution is added dropwise during 30 minutes to the dyestuff suspension. After stirring for several hours, the dyestuff has largely disappeared. Heating is effected for a short time to 90° and cooling is effected. After cooling with ice, the resulting precipitate is filtered off and washed with a mixture of equal parts of pyridine and water. The crude product, after drying, is recrystallized from o-dichlorobenzene in the presence of activated charcoal and a trace of zinc dust. The resulting pure compound is noticeably more difficultly soluble than the ones obtained in accordance with preceding examples. In solution it shows a well visible violet blue fluorescence in daylight. Its constitution is characterized by the above formula.

Example 8

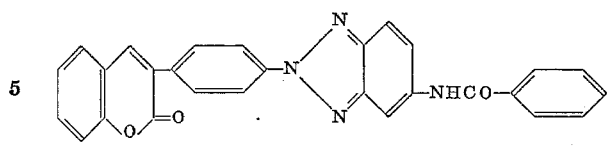

8.2 parts of moist 3-(p-aminophenyl)-coumarin hydrochloride (amine content 57.8%) are diazotized as described in Example 5 and united at 8° with a solution of 2.16 parts of 1,3-diaminobenzene and 5.1 parts of crystalline sodium acetate in 100 parts of water, coupling occurring thereby. After the reaction is complete, the resulting dyestuff is filtered off and washed with water. Thereafter it is stirred with chlorobenzene and the water is driven off by azeotropic distillation. Thereafter oxidation is effected as described in Example 5. After oxidation, cooling is effected to 0°, the resulting precipitated product is filtered off, washed first with chlorobenzene and then with ethanol. After drying at 60° in a vacuum a brownish powder results.

7.08 parts of this are dissolved in 20 parts of pyridine and acylated with 4 parts of benzoyl chloride for 3–4 hours at 95–97°. The acylation product recrystallized from chlorobenzene forms a yellowish, water insoluble powder which consists of the compound of the above formula.

A product of similar properties is obtained when the acylation is effected, instead of with benzoyl chloride, with 30 parts of acetic anhydride during 3–4 hours while boiling at reflux, excess of acid anhydride being destroyed by stirring with water and the precipitated crude product being filtered off. Purification is effected by recrystallization from aqueous dimethyl formamide, a yellowish powder being obtained.

Further products of this type may be obtained by replacing the 1,3-diaminobenzene of this example with 2.44 parts of 4-methyl-1,3-diaminobenzene, or 2.85 parts of 4-chloro-1,3-diaminobenzene and otherwise proceeding in the same way.

The compounds acylated in this way are valuable brighteners for synthetic fibres, especially for polyamide and polyester fibres.

Example 9

10 parts of the compound described in Example 1, which have previously been finely divided by dissolving in concentrated sulphuric acid and precipitation in water, are mixed with 20 parts of the sodium salt of dioctylphenylpolyglycol ether hydroxy-acetic acid, which contains 40 ethenoxy groups in the molecule, and 70 parts of water in such a way that a very fine, paste-like dispersion results.

100 parts of polyester material (Terylene, Diolen, Dacron) are placed into a bath at 50° having the following composition: 3000 parts of water, 6 parts of Dilatin TC (registered trademark of the firm Sandoz) and one part of the above described dispersion. The temperature is maintained for 15 minutes and the bath is then heated to the boil over a period of 30 minutes, 45 minutes boiling is effected and the material is then treated at 70° in a bath containing 1–2 g./l. of a non-ionogenic dispersing agent. Thereafter soaping is effected for 10 minutes (liquor ratio 1:40), warm rinsing and drying are effected. The polyester material treated in this way has been distinctly brightened in manner outstandingly fast to light and washing. When working is effected at higher temperatures, for example at 120–130°, in a closed apparatus it is possible to obtain similar white effects without using a carrier.

Example 10

100 parts of polyester material, for example Terylene, are treated for 1½ hours at 50–95° in a bath containing 3000 parts of water, 6 parts of formic acid (85%), 6 parts of sodium chlorite (80%), 6 parts of Dilatin TC and 1 part of the dispersion described in Example 9. Subsequently, the material is soaped, rinsed and dried as described in Example 9. It then has a higher degree of whiteness than material bleached for comparison purposes without the addition of the triazole derivative but otherwise under similar conditions.

*Example 11*

A material for polyester fibres (Terylene, Dacron) is impregnated by padding at room temperature using a solution containing in 1000 parts of water 1 part of the optical brightener obtained according to Example 5 and 2 parts of the sodium salt of dioctylphenylpolyglycol ether hydroxyacetic acid described in Example 9. Squeezing is effected to 80% liquid content, drying is effected at 60° for 30 minutes and warm treatment at 150° is effected for 5 minutes. The material is strongly brightened in this way, i.e., at least as strongly as by the method described in Example 9. Similar white effects as by the just described warm development treatment may be obtained by steaming, at at least two atmospheres of pressure for 15 minutes, undried goods which have been squeezed as much as possible.

*Example 12*

A polyester granulate is sprayed with powder in a mixing apparatus with 0.5% of its weight of a fine powder of the compound described in Example 5 and melted in an apparatus normally used for melt-spinning by heating to 300° in a nitrogen atmosphere for 30 minutes, stirred at this temperature for 15 minutes and brought to the spinning temperature of 265° over a period of a quarter of an hour. The mass is spun to a monothread at a pressure of 4–6 atmospheres (nitrogen).

The resulting fibres have an intensive blue fluorescence in daylight and appear whiter and lighter than comparatively produced fibres without brightener. The brightening is excellent from the fastness point of view to light, washing and solvents.

It is likewise possible to proceed advantageously in such a way that the optical brightener is not worked into the ready spinning mass as described immediately above, but by adding it already to the starting materials during polycondensation for producing the polyester spinning mass. If in the above example there is used, instead of polyester, polyamide (Grilon) or polypropylene and spinning is effected at 260–280°, there are likewise obtained threads of a higher degree of whiteness than ones produced under comparative conditions without brightener.

*Example 13*

50 parts of polyester material are briefly moved about in a mixture of 250 parts by volume of trichloroethylene and 250 parts by volume of monochlorobenzene in which 0.2 part of the optical brightener obtained according to Example 5 are dissolved. The excess solvent is centrifuged off (about 100% take-up of solvent) and the material dried at 60° in a vacuum, as well as subsequently treated for 15 minutes with water vapour at 120–130°. The polyester material treated in this way shows a higher degree of whiteness than a material subjected to chemical cleaning for purposes of comparison without the addition of brightener.

When in this example there is used, instead of the polyester material, a mixed material of cotton and polyester, for example cotton and Diolen, an equally effective improvement of the degree of whiteness is achieved.

*Example 14*

10 parts of the compound described in Example 5 is mixed with 2 parts of an anionically active dispersing agent, for example Sandozol KB (registered trademark of the firm Sandoz), 8 parts of the sodium salt of dioctyl-phenylpolyglycol ether hydroxyacetic acid described in Example 9 and 80 parts of water in such a way that a fine dispersion (paste) results. 50 parts of polyolefin fibres, for example polypropylene fibres, are treated for 1 hour at 50–95° in a bath containing 1500 parts of water, 3 parts of a carrier usually used for this purpose, e.g., Dilatin DPA (registered trademark of the firm Sandoz), and 0.25 part of the above dispersion. Warm rinsing and drying are then effected. The fibres treated in this way have a whiter and more luminous appearance than ones treated comparatively but without brightener.

A similar effect is obtained when the polypropylene used in this example is replaced with another polyolefin, for example polyethylene, polyisobutylene, etc.

*Example 15*

100 parts of a heat stable polyvinyl chloride material (Thermovyl) are treated for 1 hour at 50–95° in a bath containing 3000 parts of water and 1 part of the paste described in Example 14. After drying, the material has a distinctly whiter appearance than one comparatively treated but without brightener.

*Example 16*

100 parts of polypropylene granulate is dusted in a mixing apparatus with 0.01–0.05 part of the brightener obtainable according to Example 5, subsequently worked up in a rolling mill at 140–220° and either pressed to form plates or regranulated and sprayed to castings by a spray casting method. The resulting products have a distinctly improved degree of whiteness as compared with ones produced without the brightener. In order to produce opaque products, 2.5% of titanium dioxide is added to the mass before working up.

Instead of polypropylene it is possible to use in the above example high or low pressure polyethylene or another polyolefin.

*Example 17*

A polyvinyl chloride mass consisting of 65 parts of polyvinyl chloride, 35 parts of a softener and 2%, based on the polyvinyl chloride, of a stabilizer, is mixed with 0.05 part of the brightener obtainable according to Example 5 which is dissolved in the softener, worked up for 10 minutes at 150–160° in a rolling mill and worked up to foils. In order to produce opaque foils the mass is mixed with 2.5% of titanium dioxide before working it up. The resulting foils have an improved appearance as compared with ones produced for comparison purposes without brightener.

We claim:

1. A compound of the formula

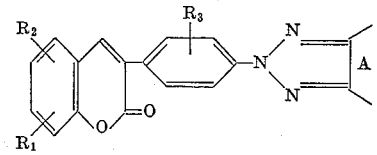

wherein A is a member selected from the group consisting of benzene, substituted benzene, naphthalene, substituted naphthalene, acenaphthene, substituted acenaphthene, indazole, substituted indazole, benztriazole, and substituted benztriazole, wherein the substituents are selected from the group consisting of methyl, methoxy, phenyl, benzoylamino, naphthyl, chlorophenyl, tolyl, cyanophenyl, methoxyphenyl, and halogen, each of $R_1$, $R_2$, and $R_3$ is a member selected from the group consisting of H, lower alkyl, and lower alkoxy.

2. The compound of the formula

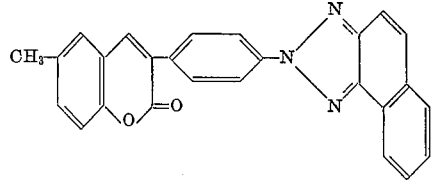

3. The compound of the formula
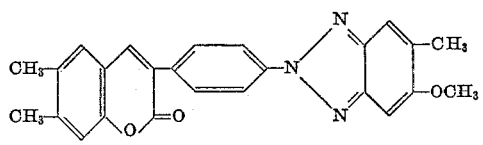
4. The compound of the formula
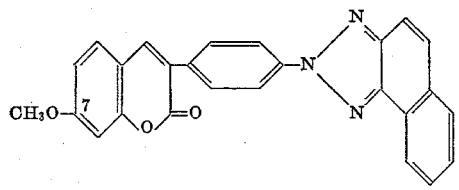
5. The compound of the formula
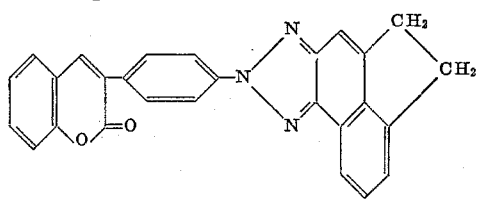
6. The compound of the formula
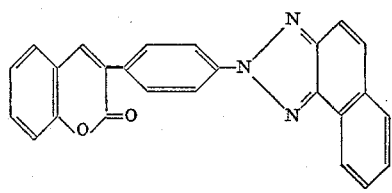
7. The compound of the formula
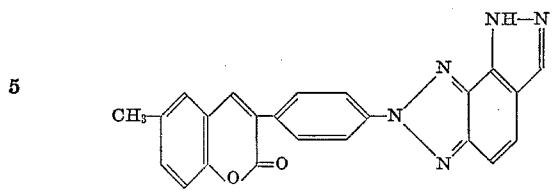
8. The compound of the formula
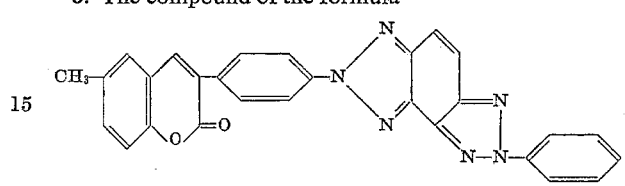
9. The compound of the formula
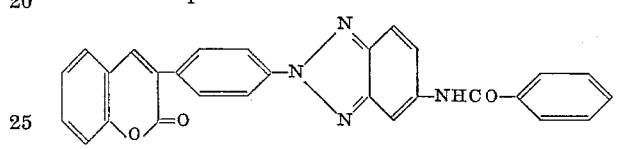
References Cited by the Examiner
Raue et al.: Chem. Abstracts, vol. 59, p. 154.20d (1963).
ALEX MAZEL, *Primary Examiner.*
NICHOLAS S. RIZZO, *Examiner.*
ALTON D. ROLLINS, *Assistant Examiner.*